United States Patent
Back et al.

(10) Patent No.: US 10,322,569 B2
(45) Date of Patent: Jun. 18, 2019

(54) SUBSTRATE BONDING METHOD AND DISPLAY SUBSTRATE MANUFACTURED THEREBY

(71) Applicant: LG CHEM, LTD., Seoul (KR)

(72) Inventors: Seung-A Back, Daejeon (KR); Joon-Hyung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 149 days.

(21) Appl. No.: 15/519,953

(22) PCT Filed: Nov. 27, 2015

(86) PCT No.: PCT/KR2015/012877
§ 371 (c)(1),
(2) Date: Apr. 18, 2017

(87) PCT Pub. No.: WO2016/085300
PCT Pub. Date: Jun. 2, 2016

(65) Prior Publication Data
US 2017/0348955 A1 Dec. 7, 2017

(30) Foreign Application Priority Data
Nov. 27, 2014 (KR) .......... 10-2014-0167056
Nov. 27, 2015 (KR) .......... 10-2015-0167488

(51) Int. Cl.
*B32B 37/12* (2006.01)
*B32B 38/00* (2006.01)

(52) U.S. Cl.
CPC ........... *B32B 37/12* (2013.01); *B32B 38/145* (2013.01); *B32B 2310/0831* (2013.01); *B32B 2457/20* (2013.01)

(58) Field of Classification Search
CPC ............................ B32B 37/12; B32B 38/145
See application file for complete search history.

(56) References Cited

U.S. PATENT DOCUMENTS

| | | | |
|---|---|---|---|
| 4,983,429 A * | 1/1991 | Takayanagi | G02F 1/13394 156/275.7 |
| 2004/0090429 A1* | 5/2004 | Geaghan | G06F 3/03547 345/173 |
| 2007/0019150 A1 | 1/2007 | Slikkerveer et al. | |
| 2007/0263165 A1 | 11/2007 | Sung et al. | |
| 2008/0124525 A1* | 5/2008 | Ushiki | C09J 7/35 428/195.1 |
| 2010/0253894 A1* | 10/2010 | Yoon | G02F 1/133753 349/123 |
| 2012/0176663 A1 | 7/2012 | Zang et al. | |

FOREIGN PATENT DOCUMENTS

KR 10-2007-0108982 A 11/2007

* cited by examiner

*Primary Examiner* — Daniel McNally
(74) *Attorney, Agent, or Firm* — Dentons US LLP

(57) ABSTRACT

The present invention relates to a substrate bonding method and a display substrate manufactured thereby, the method comprising the steps of: (1) forming a pattern by ink-jet printing a photo-curable adhesive ink on a lower substrate; (2) forming a spacer on the lower substrate by photo-curing the pattern; (3) forming an adhesive layer by ink-jet printing the photo-curable adhesive ink on the surface of the lower substrate on which the spacer is formed; and (4) laminating the adhesive layer of the lower substrate and an upper substrate by performing photo-curing.

10 Claims, 7 Drawing Sheets

SUBSTRATE BONDING METHOD AND DISPLAY SUBSTRATE MANUFACTURED THEREBY

TECHNICAL FIELD

This application is a National Stage Entry of International Application No. PCT/KR2015/012877, filed on Nov. 27, 2015, and claims the benefit of Korean Patent Application No. 10-2014-0167056, filed on Nov. 27, 2014 and Korean Patent Application No. 10-2015-0167488, filed on Nov. 27, 2015, all of which are hereby incorporated by reference in their entirety for all purposes as if fully set forth herein.

The present invention relates a substrate bonding method and a display substrate manufactured thereby.

BACKGROUND ART

Recently, a substrate for a display device has been used while a functional film is attached thereto in order to implement various functions. As electronic devices have a tendency to be decreased in size and be improved in performance, there is a need for lighter, thinner, shorter and more compact electronic products as a technical problem.

Meanwhile, in conventional process of bonding a substrate glass with a film, a transparent adhesive sheet having a thickness of approximately 100 μm was used to attach them. However, there is a problem in that it is insufficient to meet the current customers' need for high functionality, small size, and slim thickness of a display material. Thus, a printing technology such as bar coating or slot die coating has been used to bonding a substrate glass with a film with a small uniform thickness of 10 μm or less However, the method also has a limitation in that a substrate and a functional film cannot be bonded to each other with a uniform thickness, and a sufficiently small thickness cannot be implemented.

DISCLOSURE

Technical Problem

In a conventional substrate bonding method, a printing technology such as bar coating or slot die coating is used. However, the method has a limitation in achieving a bonding layer with a uniform thickness and a small thickness.

Thus, an object of the present invention is to provide a substrate bonding method using a printing process.

In particular, an object of the present invention is to bond a lower substrate and an upper substrate with a uniform thickness by forming a spacer using a printing process.

In addition, an object of the present invention is to provide a method for bonding a lower substrate and an upper substrate not only with a uniform thickness, but also with a small thickness. Furthermore, an object of the present invention is to provide a substrate capable of being used for various displays by using the bonding method of the present invention.

Technical Solution

In order to accomplish the objects, the present invention provides a substrate bonding method, the method comprising the steps of: (1) forming a pattern by ink-jet printing a photo-curable adhesive ink on a lower substrate; (2) forming a spacer on the lower substrate by photo-curing the pattern; (3) forming an adhesive layer by ink-jet printing the photo-curable adhesive ink on the surface of the lower substrate on which the spacer is formed; and (4) laminating the adhesive layer of the lower substrate and an upper substrate by performing photo-curing.

According to a preferred embodiment of the present invention, the lower substrate and the upper substrate may be glass or a film.

Moreover, the pattern in Step (1) may be any one or more selected from a point pattern and a line pattern, and the pattern may additionally include a partition wall pattern on the outer edge of a substrate.

According to a preferred embodiment of the present invention, the partition wall pattern may be in a form of being partially open, and the partition wall pattern may have a round edge portion.

According to a preferred embodiment of the present invention, the photo-curable adhesive ink may be cured by UV-curing or electron beam curing, and may include an epoxy compound, a photopolymerization initiator, a surfactant, a photostabilizer, and a solvent.

According to a preferred embodiment of the present invention, the photo-curing in Step (2) may be carried out by using UV irradiation at an intensity of 50 to 500 mW/cm$^2$ for 5 to 500 seconds, or may be carried out by using electron beam for 5 to 500 seconds.

According to a preferred embodiment of the present invention, the spacer may have a height of 1.0 to 10 μm.

According to a preferred embodiment of the present invention, a dot pitch between the spacers may be 300 μm or more, preferably 300 to 2,500 μm.

According to a preferred embodiment of the present invention, a dot pitch of the ink-jet printing when the adhesive layer is formed in Step (3) may be 100 to 150 μm.

Another aspect of the present invention provides a display substrate manufactured by the substrate bonding method of the present invention.

Advantageous Effects

The present invention may provide a substrate bonding method using an ink-jet process.

Further, the present invention can form a desired pattern in a non-contact manner within a short period of time by using an ink-jet process. In addition, the present invention can bond an upper plate and a lower plate at a uniform pitch.

Furthermore, a substrate is bonded by using an adhesive layer having a small thickness, and thus may be used for various display devices.

BEST MODE

Hereinafter, the present invention will be described in detail. The following specific description describes an exemplary embodiment of the present invention, and thus is not intended to limit the right scope defined by the claims even though there is a definite expression.

In the substrate bonding method in the related art, a printing technology such as bar coating or slot die coating is used. However, the method has a limitation in achieving bonding with a uniform thickness and a small thickness.

Thus, as a result of intensive studies to solve the above-described problems, the present inventors have found that when a substrate is bonded by using an ink-jet process, the thickness may be adjusted. That is, the present invention provides a substrate bonding method, the method comprising the steps of: (1) forming a pattern by ink-jet printing a photo-curable adhesive ink on a lower substrate; (2) forming a spacer on the lower substrate by photo-curing the pattern; (3) forming an adhesive layer by ink-jet printing the photo-curable adhesive ink on the surface of the lower substrate on which the spacer is formed; and (4) laminating the adhesive layer of the lower substrate and an upper substrate by performing photo-curing.

The dot of the present invention means a liquid droplet formed on a base material from the discharge of a photo-curable adhesive through an ink-jet heat in an ink-jet process.

FIG. 1A through 1C and FIG. 2A through 2C are a schematic view of a substrate bonding method according to a preferred embodiment of the present invention.

Figure 1A:
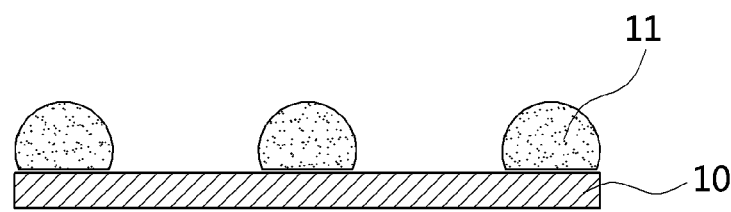
FIG. 1A through 1C is a schematic view of a substrate bonding method according to a preferred embodiment of the present invention.
Figure 1B:
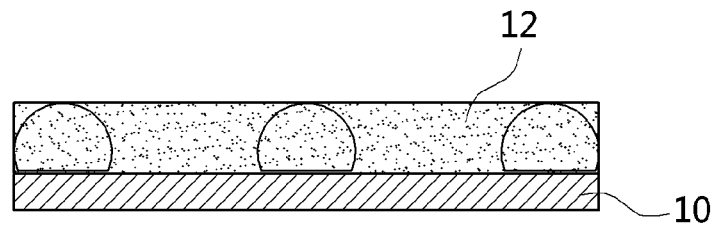
Figure 1C:
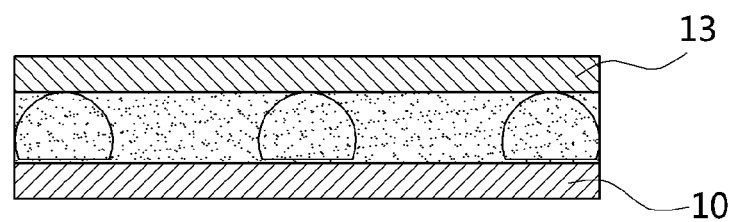
Figure 2A:
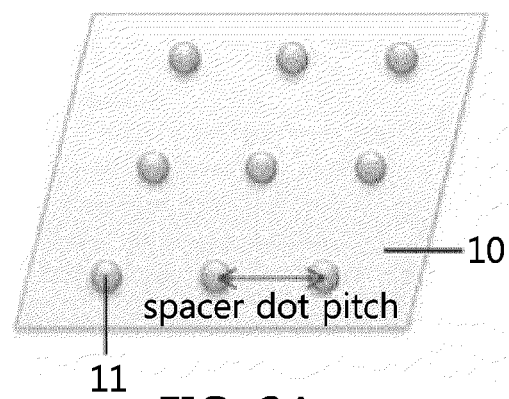
FIG. 2A through 2C is a schematic view of a substrate bonding method according to a preferred embodiment of the present invention.
Figure 2B:
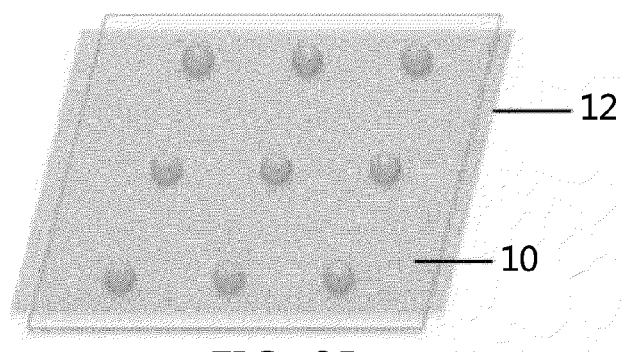
Figure 2C:
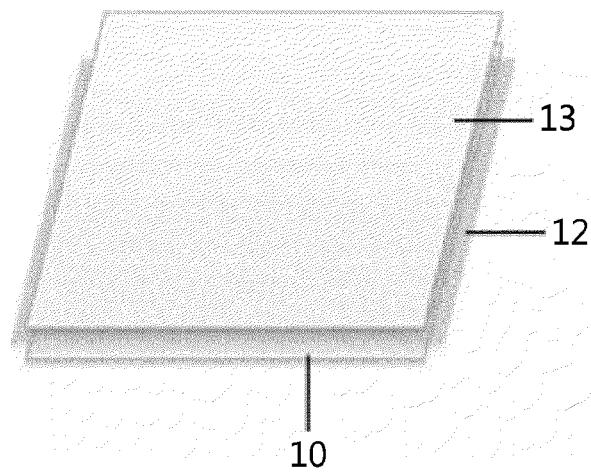

When the method is specifically described, in FIG. 1A and FIG. 2A, a photo-curable adhesive pattern formed through the ink-jet process is cured, and as a result, a spacer 11 is formed on a lower substrate 10. Moreover, in FIG. 1B and FIG. 2B, the photo-curable adhesive ink is jetted on the entire surface of the lower substrate on which the spacer is formed, and as a result, an adhesive layer is formed. In FIG. 1C and FIG. 2C, the adhesive layer and the upper substrate were laminated by performing photo-curing, thereby bonding the lower substrate to the upper substrate.

Hereinafter, the substrate bonding method of the present invention will be described.

First, Step (1) will be described.

In the present step, a pattern is formed by ink-jet printing a photo-curable adhesive ink on a lower substrate. Specifically, the photo-curable adhesive ink may be used and jetted on the lower substrate through an ink-jet head of the ink-jet printer, thereby forming the pattern as a dot. According to a preferred embodiment of the present invention, the lower substrate may be glass or a film. Moreover, any film may be used as long as the film is typically used, and the substrate may be appropriately selected and used according to the intended use.

If a heat-curable adhesive ink is used, it is difficult to use a film as a substrate because a high temperature adjustment is accompanied. However, in the present invention, a film may used without any limitation in using a substrate by using a photo-curable adhesive ink.

Any ink may be used as long as the photo-curable adhesive ink can be typically used, and the photo-curable adhesive ink may include preferably an epoxy compound, a photopolymerization initiator, a surfactant, a photostabilizer, and a solvent. Moreover, the photo-curable adhesive ink may further include one or more of a corrosion preventing agent and a pH adjusting agent in addition to the aforementioned ingredients. According to a preferred embodiment of the present invention, the photo-curable adhesive ink may be for UV-curing or electron beam curing, and may be preferably for UV-curing.

Figure 3A:
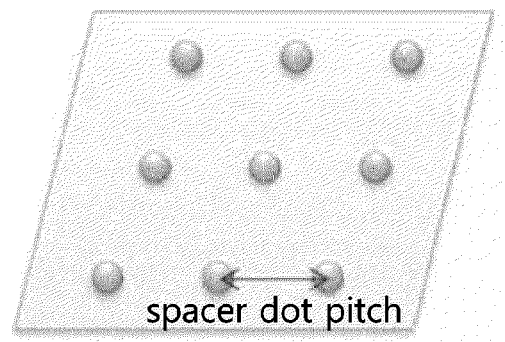
FIGS. 3A and 3B is a schematic view of a pattern formed on a substrate according to a preferred embodiment of the present invention.
Figure 3B:
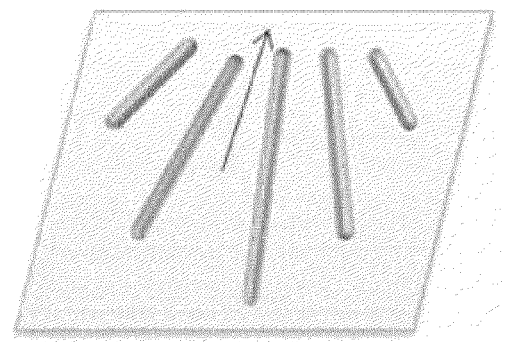

According to a preferred embodiment of the present invention, the pattern in Step (1) may include any one or more selected from a point pattern and a line pattern. When the pattern in Step (1) is described with reference to FIGS. 3A and 3B, in FIG. 3A, a point pattern is formed by using dots on a substrate, and in FIG. 3B, dots are connected to each other to form a line pattern. In the present invention, a spacer is formed while almost maintaining the form of the pattern. That is, since the photo-curable adhesive ink suggested by the present invention is cured, and then scarcely shrunk, the shape may be maintained as it is. However, when liquid droplets are discharged, and then are not immediately cured, the shape may vary according to the viscosity or surface tension, but liquid droplets may slightly spread. However, it can be also seen that when liquid droplets are discharged, and then immediately cured, there is little aberration.

Meanwhile, the arrangement and shape of the pattern has to be adjusted when the pattern is formed, such that in Step (4) of laminating the upper substrate, the air is easily emitted. The pattern may be formed by adjusting the dot diameter, the dot height, and the dot pitch during the jetting in the present step. Further, the dot diameter, the dot height, and the dot pitch as described above can be adjusted through the jetting conditions or/and the composition of the photo-curable adhesive ink. According to a preferred embodiment of the present invention, the dot pitch in Step (1) may be 300 to 2,500 μm, preferably 500 to 1,800 μm. If the dot pitch is less than 300 μm, the ink may not uniformly spread on the entire substrate due to the capillary effect when an adhesive layer is formed by applying the ink on the entire surface of the lower substrate in Step (3). Further, there may be a problem in that pores are produced between spacers which are dots, and as a result, the substrate is not neatly bonded, and is easily detached. Further, when the dot pitch is more than 2,500 μm, it may be difficult to uniformly bond the substrate due to the hanging down of the substrate, and the like.

According to a preferred embodiment of the present invention, the pattern may additionally include a partition wall pattern on the outer edge of a substrate. The partition wall pattern serves to prevent the adhesive ink from being overflown to the outside of the bonding surface when the photo-curable adhesive ink is ink-jet printed in Step (3). Moreover, the partition wall pattern may be in the form of being partially open. When the partition wall pattern is in the form of being partially open, an extra adhesive may exit to the outside through the open portion when Step (3) is carried out, thereby facilitating the removal of the extra adhesive in the subsequent process. Further, the partition wall pattern may have a round edge portion. In forming the partition wall, the collection of bubbles at the edge portion can be solved by forming the edge in a round shape in order to prevent bubbles from being collected at the edge portion.

Figure 4A:
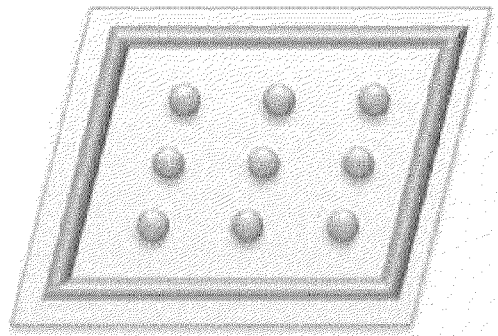
FIG. 4A through 4C is a schematic view of a pattern formed on a substrate according to another preferred embodiment of the present invention.
Figure 4B:
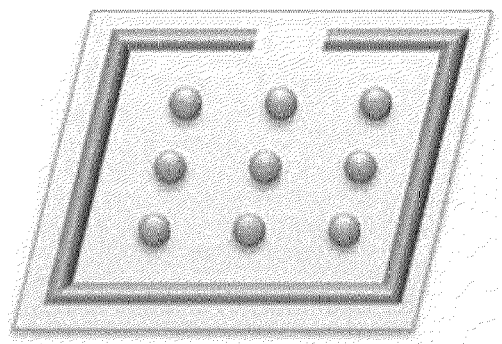
Figure 4C:
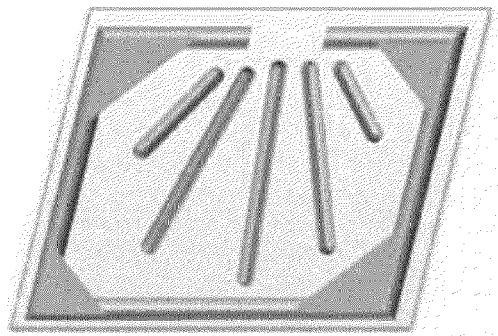

When the pattern of the present invention is described with reference to FIG. 4A through 4C, in FIG. 4A, the partition wall pattern is formed on the outer edge of the substrate and the point pattern is formed inside the partition wall pattern. In FIG. 4B, a partition wall pattern in the form of being partially open is formed on the outer edge of the substrate and a point pattern is formed inside the partition wall pattern. In FIG. 4C, a partition wall pattern having a round edge portion is formed on the outer edge of the substrate and a line pattern is formed inside the partition wall pattern. Moreover, a line pattern is a pattern which may move bubbles formed when the photo-curable adhesive ink is applied onto the entire surface of the lower substrate in Step (4).

Next, Step (2) will be described.

The present step is a step of forming a spacer by photo-curing the photo-curable adhesive ink pattern in Step (1). The photo-curing may be carried out according to the kind of photo-curable adhesive ink used in Step (1). According to a preferred embodiment of the present invention, the photo-curing may be ultraviolet (UV)-curing or electron beam (E-beam)-curing, and may be preferably ultraviolet (UV)-curing. Moreover, any method may be used as long as the ultraviolet (UV)-curing may be usually used, but preferably, the ultraviolet (UV)-curing may be carried out at an intensity of 50 to 500 mW/cm$^2$ for 5 to 500 seconds. Moreover, the electron beam-curing may be carried out for 5 to 500 seconds.

The spacer of the present invention serves as a support for bonding a lower substrate and an upper substrate at a uniform pitch, and may have a form and a size which are the same as those of the pattern of the adhesive ink formed in Step (1). That is, the spacer may have a height of 1.0 to 10 μm. If the height of the spacer is less than 1.0 μm, it may be difficult to form the spacer, and if the height is more than 10 μm, it is difficult to form a thin adhesive layer.

Next, Step (3) will be described.

In the present step, an adhesive layer is formed by jetting the photo-curable adhesive ink on the entire surface of the lower substrate on which the spacer is formed in accordance with the height of the spacer formed in Step (2) by the ink-jet process. That is, according to a preferred embodiment of the present invention, the thickness of the adhesive layer may be 1.0 to 10 μm and corresponds to the height of the spacer. Moreover, the photo-curable adhesive in the present step may be the same as the adhesive in Step (1).

As a substrate bonding method in the related art, a substrate is bonded by using an adhesive sheet as an adhesive layer. Alternatively, as another method in the related art, an adhesive layer is formed by bar coating or slot coating. However, by the methods in the related art, it is difficult to form an adhesive layer at a uniform pitch, and it is difficult to form an adhesive layer with a small thickness.

Thus, the present invention may have a uniform pitch, and may form an adhesive layer with a small thickness by forming a spacer by an ink-jet process to form an adhesive layer in accordance with the height of the spacer. Accordingly, an alignment between lower substrate and the upper substrate may be uniformly established, thereby bonding the adhesive layer with a thickness of 10 μm or less as a height which is the same as the height of the spacer.

According to a preferred embodiment of the present invention, the dot pitch in Step (3) may be 50 to 200 μm, preferably 100 to 150 μm. If the dot pitch is less than 50 μm, there may be a problem in that when the adhesive layer in Step (3) is formed, the amount of ink applied to the entire surface is so large that the ink is overflown and it is difficult to bond only a desired area. Moreover, it the dot pitch is more than 200 μm, there may be a problem in that when the adhesive layer in Step (3) is formed, the amount of ink applied to the entire surface is so small that the upper substrate is not attached well.

That is, since the dot pitch in Step (1) is a pitch for forming a pattern, and the dot pitch in Step (3) is a pitch for forming an adhesive layer, the ranges are different from each other.

Next, Step (4) will be described.

The present step is a step of laminating an upper substrate to the adhesive layer formed in Step (3) by performing photo-curing by attaching the upper substrate to the adhesive layer formed in Step (3). The photo-curing of the present step may be carried out in accordance with the kind of adhesive layer, and the photo-curable adhesive may be the same as the adhesive in Step (1). Moreover, according to a preferred embodiment of the present invention, the upper substrate may be glass or a film.

In conclusion, in the present invention, the lower substrate and the upper substrate may be bonded to each other with a uniform and small thickness by using an ink-jet process and forming a spacer.

Another aspect of the present invention provides a display substrate manufactured by the substrate bonding method of the present invention.

Mode for Invention

Hereinafter, the present invention will be described in more detail based on Examples, but exemplary embodiments of the present invention to be disclosed below are only illustrative, and the scope of the present invention is not limited to these exemplary embodiments. The scope of the present invention is defined by the claims, and is intended to include any modification within the meaning and scope equivalent to the terms of the claims. Further, in the following Examples and Comparative Examples, "%" and "parts" representing the content is a weight standard unless otherwise particularly mentioned.

Example 1

A primary ink was jetted on a glass substrate which is a lower substrate by using a Nova head in which the amount of UV adhesive ink discharged at one time was 80 pL. The dot manufactured during the jetting of the ink was formed with a diameter of 200 μm on average and a height of 3.5 μm on average. Moreover, a nozzle pitch of the Nova head was 279 μm, and a point pattern with a pitch of 558 μm was formed. The point pattern formed was cured by a UV lamp with a wavelength of 395 nm for about 5 seconds, thereby forming a spacer. And then, a UV adhesive, which is the same as that in the primary ink jetting, was applied to the entire surface of the substrate on which the spacer was formed, thereby forming an adhesive layer having a thickness of 3.5 μm. For the application on the entire surface, the UV adhesive was applied by tilting an ink-jet head to establish the dot pitch as 150 μm. When the application on the entire surface was completed, glass as an upper substrate was adhered to the lower substrate, and then the upper plate was completely bonded to the lower plate by performing curing for 5 seconds in the same manner as when the spacer was formed using a UV lamp.

Examples 2 to 6 and Comparative Examples 1 to 10

An experiment was carried out in the same manner as in Example 1, except that the spacer interval and the dot pitch in the following Table 1 were applied.

TABLE 1

| | Spacer interval | Dot pitch during the application on the entire surface |
|---|---|---|
| Example 1 | 558 μm | 150 μm |
| Example 2 | 558 μm | 100 μm |
| Example 3 | 1116 μm | 150 μm |
| Example 4 | 1116 μm | 100 μm |
| Example 5 | 2232 μm | 150 μm |
| Example 6 | 2232 μm | 100 μm |
| Comparative Example 1 | 279 μm | 50 μm |
| Comparative Example 2 | 279 μm | 100 μm |
| Comparative Example 3 | 279 μm | 150 μm |
| Comparative Example 4 | 279 μm | 200 μm |
| Comparative Example 5 | 558 μm | 50 μm |
| Comparative Example 6 | 558 μm | 200 μm |
| Comparative Example 7 | 1116 μm | 50 μm |
| Comparative Example 8 | 1116 μm | 200 μm |
| Comparative Example 9 | 2232 μm | 50 μm |
| Comparative Example 10 | 2232 μm | 200 μm |

Comparative Example 11

An ink was jetted on a glass substrate which is a lower substrate by using a Nova head in which the amount of UV adhesive ink discharged at one time was 80 pL. The dot manufactured during the jetting of the ink was formed with a diameter of 200 μm on average and a height of 3.5 μm on average. Moreover, a nozzle pitch of the Nova head was 279 μm, and a point pattern with a pitch of 558 μm was formed. And then, the upper plate was bonded to the lower plate by attaching glass which is an upper substrate to the lower substrate.

Experimental Example 1

Figure 5:
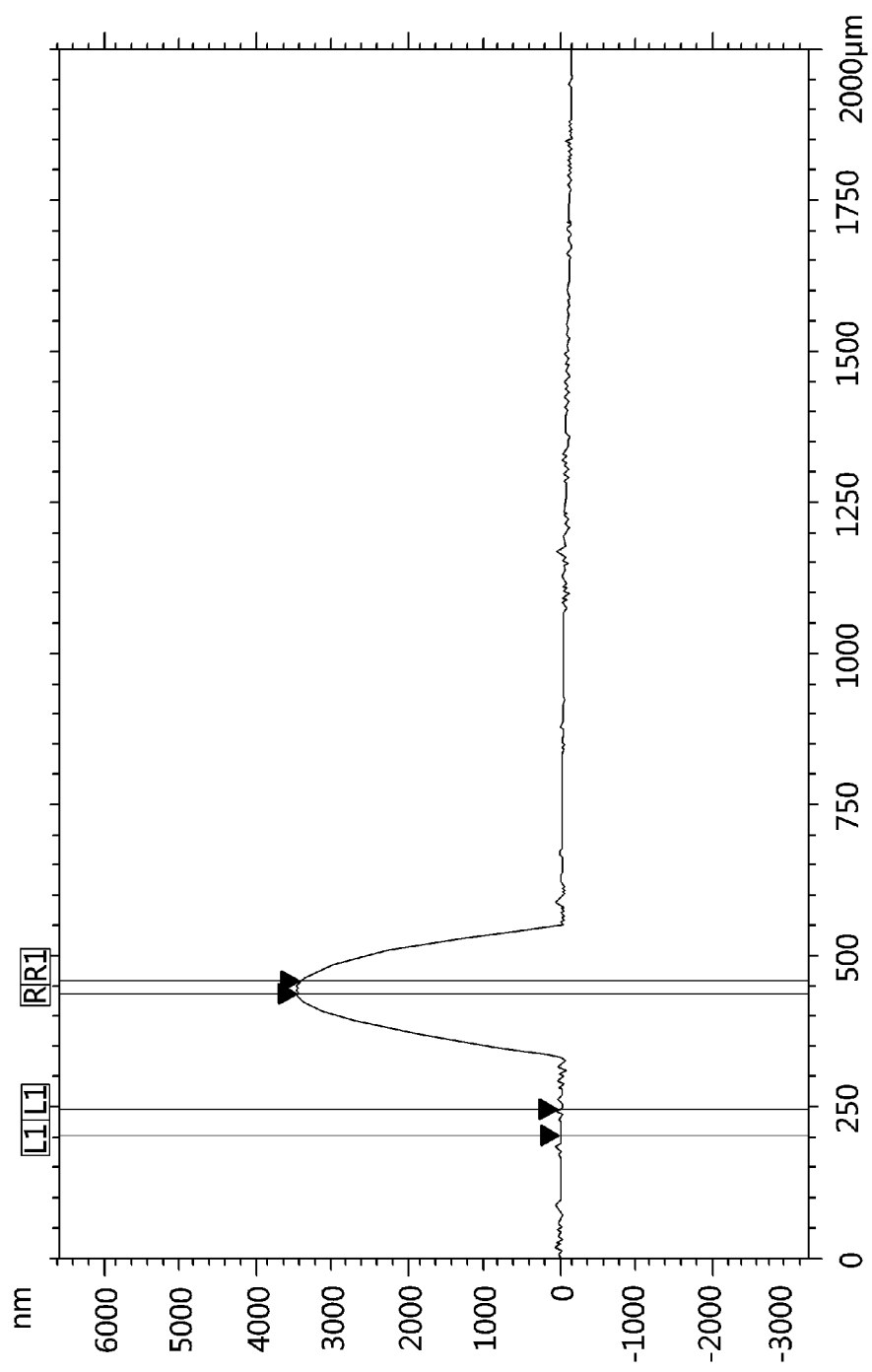
FIG. 5 is a graph of a cross-section shape of a spacer according to Experimental Example 1 of the present invention.

A cross-sectional shape of the spacer was measured from Example 1 by using an alpha step (a-step) measuring device, and the result is shown in FIG. 5.

In conclusion, it can be confirmed through FIG. 5 that the dot diameter is 200 μm, the height is 3.5 μm.

Experimental Example 2

Figure 6:
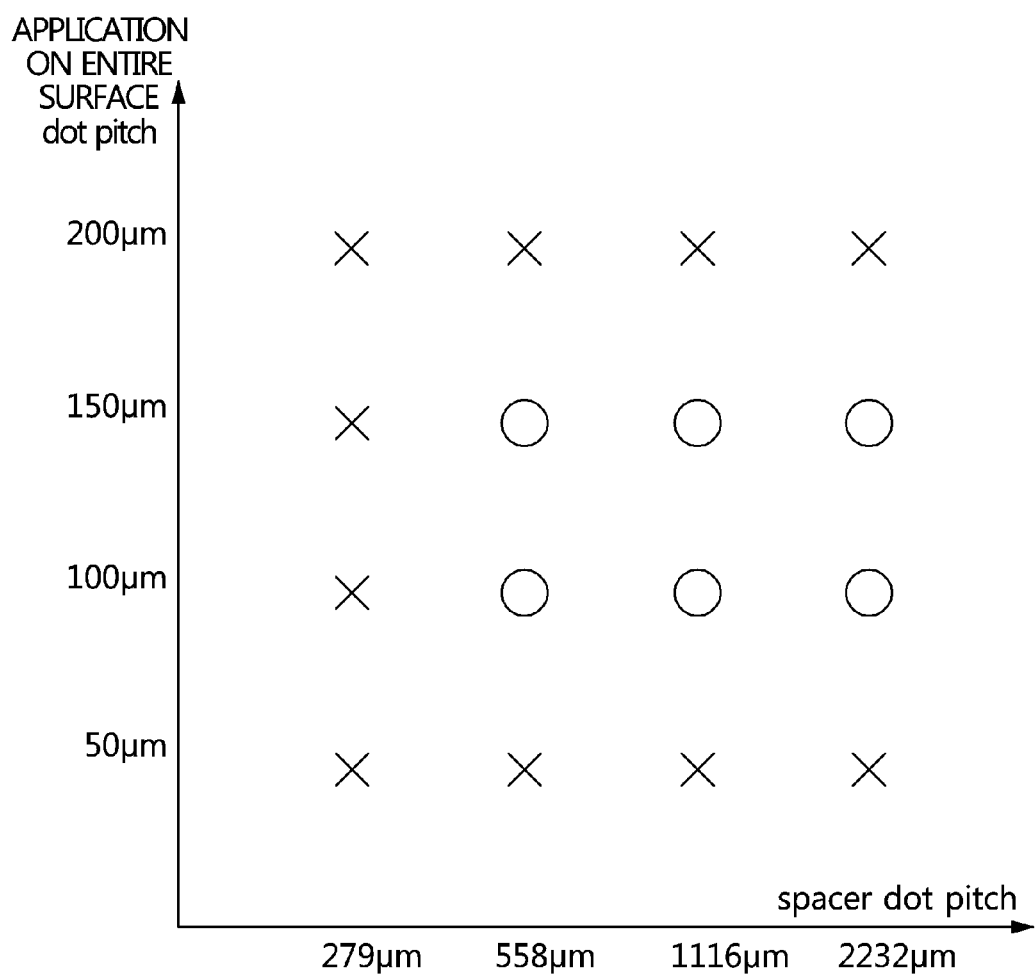
FIG. 6 is a graph illustrating the adhesive strength experimental results of Examples and Comparative Examples according to Experimental Example 2 of the present invention.

The bonding strengths were measured by applying a grip strength of about 1,000 gf/cm to the bonded glass substrates in Examples 1 to 6 and Comparative Examples 1 to 11.
◯: not separated due to excellent bonding strength
X: separated due to poor bonding strength
As can be seen in FIG. 6, it can be seen that Examples 1 to 6 have excellent bonding strength when the dot pitch is 150 μm or less and 100 μm or more during the formation of an adhesive layer by applying an adhesive to the entire surface in order to form the adhesive layer while sufficiently establishing a dot pitch at 300 μm or more when a spacer as a point pattern is formed.

In contrast, it could be seen that Comparative Examples 1 to 10 failed to satisfy the dot pitch of the spacer and the dot pitch during the formation of the adhesive layer, and as a result, the bonding strength deteriorated.

Figure 7:
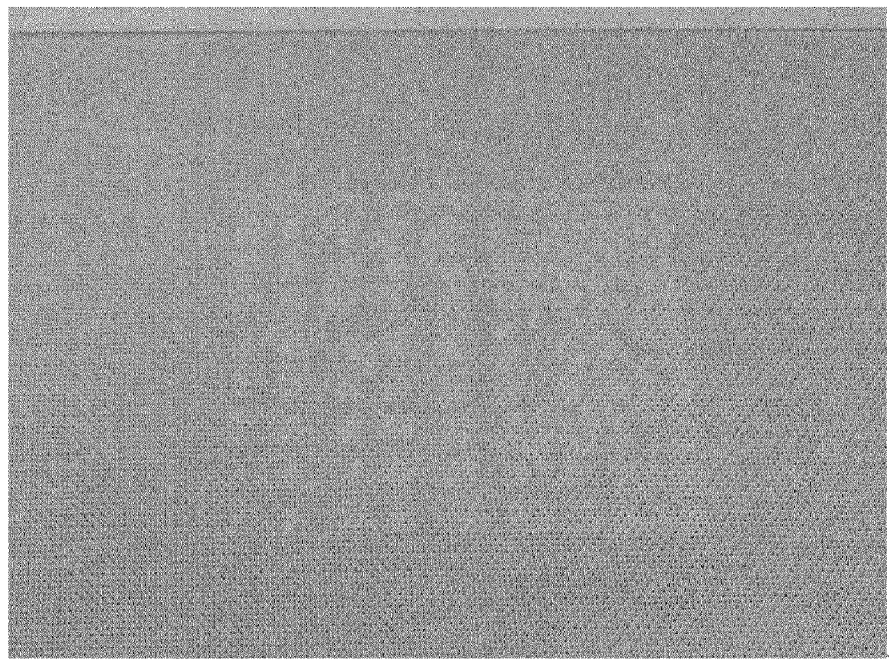
FIG. 7 is a photograph illustrating a substrate manufactured according to Comparative Example in Experimental Example 2 of the present invention.

Further, as can be seen from FIG. 7, it could be seen that in Comparative Example 11, the formed dots were crushed, and it was difficult to form a uniform pitch.

[Explanation of Reference Numerals]

10: Lower substrate
11: Spacer
12: Adhesive layer
13: Upper substrate

The invention claimed is:

1. A substrate bonding method comprising the steps of:
 (1) forming a pattern, wherein the pattern is any one or more selected from a point pattern and a line pattern, by ink-jet printing a photo-curable adhesive ink on a lower substrate;
 (2) forming a spacer having a height of 1.0 to 10 μm on the lower substrate by photo-curing the pattern;
 (3) forming an adhesive layer by ink-jet printing the photo-curable adhesive ink on the surface of the lower substrate on which the spacer is formed; and
 (4) laminating the adhesive layer of the lower substrate and an upper substrate by performing photo-curing,
 wherein a dot pitch of the ink-jet printing in Step (1) is 300 to 2,500 μm, wherein a dot pitch of the ink-jet printing in Step (3) is 50 to 200 μm.

2. The method of claim 1, wherein the pattern additionally comprises a partition wall pattern on an outer edge of the substrate.

3. The method of claim 2, wherein the partition wall pattern is in a form of being partially open.

4. The method of claim 2, wherein the partition wall pattern has a round edge portion.

5. The method of claim 1, wherein the lower substrate and the upper substrate are glass or a film.

6. The method of claim 1, wherein the photo-curable adhesive ink is for UV-curing or electron beam curing.

7. The method of claim 1, wherein the photo-curable adhesive ink comprises an epoxy compound, a photopolymerization initiator, a surfactant, a photostabilizer, and a solvent.

8. The method of claim 1, wherein the photo-curing in Step (2) is carried out at an UV intensity of 50 to 500 mW/cm$^2$ for 5 to 500 seconds.

9. The method of claim 1, wherein the photo-curing in Step (2) is carried out for 5 to 500 seconds by using electron beam.

10. The method of claim 1, wherein a dot pitch of the ink-jet printing in Step (3) is 100 to 150 μm.

* * * * *